Sept. 20, 1966    E. A. MARGUS    3,273,509
CENTRIFUGAL PUMP
Filed April 7, 1964    3 Sheets-Sheet 1

INVENTOR.
EDWARD A. MARGUS
BY James and Franklin
ATTORNEYS

Sept. 20, 1966  E. A. MARGUS  3,273,509
CENTRIFUGAL PUMP
Filed April 7, 1964  3 Sheets-Sheet 2

INVENTOR.
EDWARD A. MARGUS
BY
ATTORNEYS

INVENTOR.
EDWARD A. MARGUS
BY
ATTORNEYS

3,273,509
CENTRIFUGAL PUMP

Edward A. Margus, Morris Plains, N.J., assignor to Vanton Pump & Equipment Corp., a corporation of New Jersey
Filed Apr. 7, 1964, Ser. No. 357,874
1 Claim. (Cl. 103—103)

This invention relates to pumps, and more particularly to centrifugal pumps.

The usual centrifugal pump has an overhung shaft carried on two spaced bearings. To prevent leakage the pump casing has an elaborate shaft seal which may include brittle rings made, for example, of a ceramic or carbon. For access to the seal for inspection and servicing the adjacent shaft bearing must be spaced axially some distance from the seal. There is accordingly considerable overhang to the pump impeller, with consequent deflection of the shaft at the impeller. The farther shaft bearing has been spaced axially to better support the shaft with its large overhang, which in turn greatly increases the overall length of the pump assembly.

The general object of the present invention is to overcome the foregoing difficulties, and to provide a centrifugal pump in which one shaft bearing is located very close to the seal, so that there is no perceptible deflection at the impeller, and yet much more room than before is made available for easy access to the shaft seal. Considered in different aspect, an object of the invention is to reduce the overall length of the pump, or to increase the spacing between the main bearings, or both.

Shaft seals are made by different companies specializing in that product, and differ in dimension as well as construction. In accordance with a feature of the invention, the bearing adjacent the seal may be shifted axially and locked in desired position, thereby adapting the pump to use any desired shaft seal, even though one seal may differ considerably from another in axial dimension. The purchaser of the pump may suit his own preference as to the particular shaft seal to be employed.

Still another object is to provide a pump adapted to handle corrosive liquids. To this end, the parts which come into contact with the liquid may be made of a moldable plastics material instead of metal, and yet are backed by metal.

A further object of the invention is to provide a pump the shaft seal of which may be water cooled when desired.

To accomplish the foregoing general objects, and other more specific objects which will hereinafter appear, my invention resides in the centrifugal pump elements and their relation one to another, as are hereinafter more particularly described in the following specification. The specification is accompanied by drawings in which.

Figure 1:
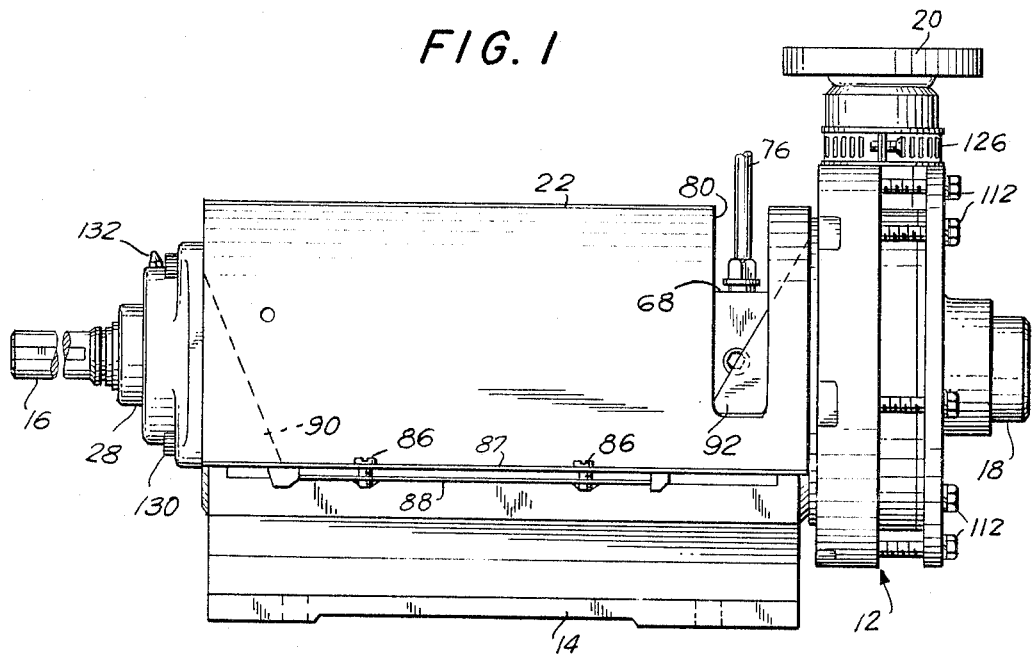
FIG. 1 is a side elevation of a pump embodying features of my invention.
Figure 2:
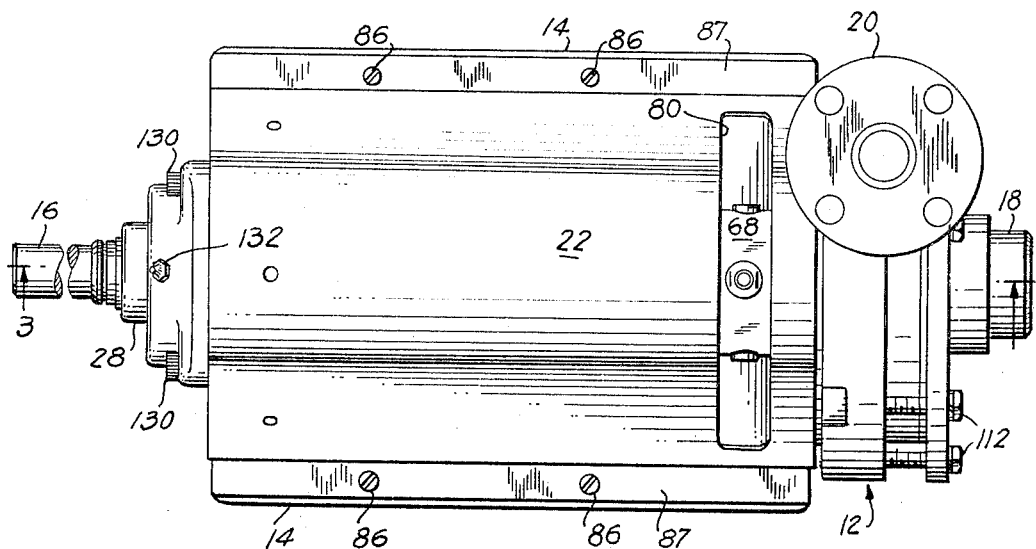
FIG. 2 is a plan view of the same.

Referring to the drawing, and more particularly to FIGS. 1 and 2, the centrifugal pump comprises a casing generally designated 12, mounted at one end of a base 14. The pump is driven by a motor, not shown, said motor being coupled to the projecting end of pump shaft 16. Liquid is supplied to the pump at an inlet 18, and is discharged from the pump at an outlet 20. The bearings of the pump are shielded by a protective hood 22, which is upwardly convex, and which is secured at its lower edges to the base 14. The hood 22 is readily removed.

Figure 3:
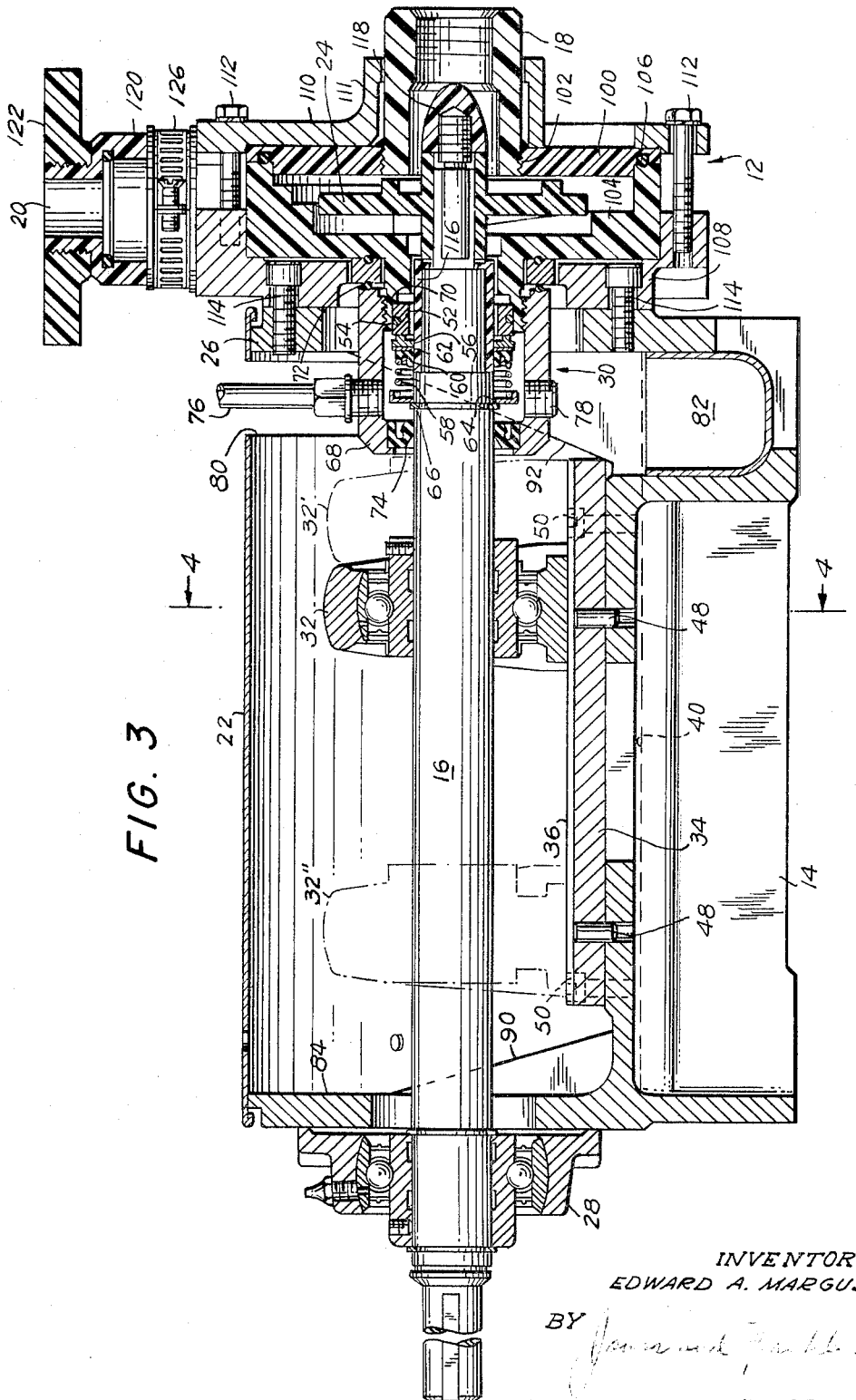
FIG. 3 is a longitudinal vertical section through the pump.

Referring now to FIG. 3 of the drawing, the pump casing houses an impeller 24 carried on shaft 16. The pump casing 12 is mounted at one end of base 14, and more specifically on an upright pedestal plate 26. There is a fixed bearing 28 mounted at the other end of base 14, and a seal, generally designated 30, around the shaft 16 at the pump casing 12. Bearing 32 carries the overhung shaft 16, and is slidably mounted on the base 14, so that its distance from seal 30 may be varied. In operation it is moved closer to the bearing, as shown in broken lines at 32', thereby reducing the overhang of the shaft, and minimizing deflection at the impeller 24. However, the bearing 32 may be slid all the way to the left, as shown in broken lines at 32", for easy access to the seal 30.

In preferred form I provide a slide plate 34 which is fixedly mounted on base 14 beneath the slidable bearing 32. The plate and bearing have means, in this case a guide key 36 (FIG. 4), to keep the slidable bearing 32 in accurate alignment with the fixed bearing 28 and the pump, as the bearing 32 is moved toward or away from the seal 30.

Figure 4:
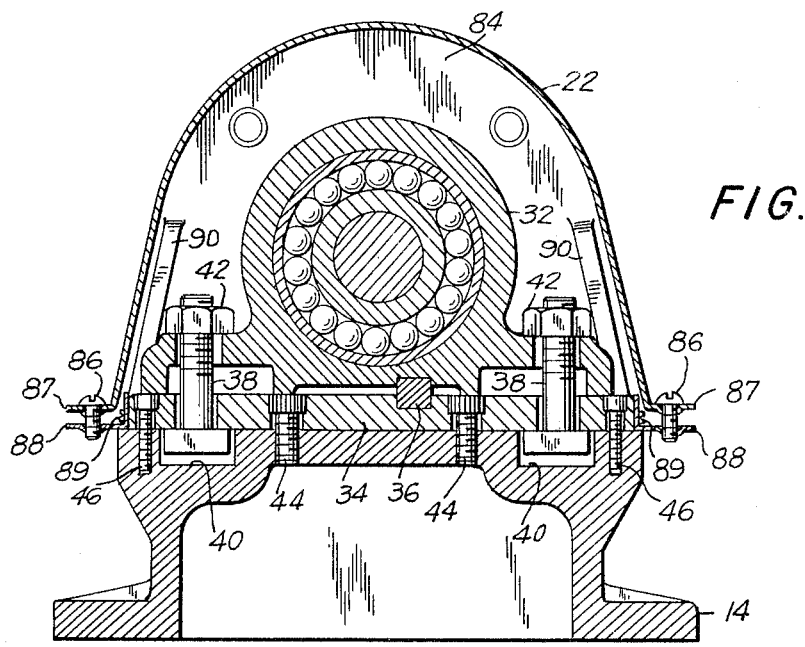
FIG. 4 is a transverse vertical section, taken approximately on the line 4—4 of FIG. 3.

Referring to FIG. 4, the slidable bearing 32 is preferably secured in position by means of inverted T-head bolts 38, the heads of which are received in T-slots 40 formed in the base 14. In the specific form here shown the slide plate 34 has narrow slots for the shanks of the T-bolts, while the cast portion of the base has wide slots at 40 for the heads of the T bolts. As is known, the heads are square to hold them against rotation when tightening the nuts 42. FIG. 4 also shows how the guide key 36 is preferably offset from the center line of the base, thereby guarding against any possibility of the bearing 32 being removed and replaced in reverse position.

The plate 34 is fixedly and strongly mounted on the cast base 14 by means of suitable screws, here indicated at 44 and 46. To insure precise and accurate location of plate 34 on the base, pilot pins may be employed, and two such pilot pins are indicated at 48 in FIG. 3. The key 36 is anchored on plate 34 by means of a screw at each end, indicated at 50 in FIG. 3.

The seal 30 may be of any desired character. In the particular case here shown the seal is one which is commercially sold by Crane Packing Co. of Chicago, Illinois. It comprises a ceramic seat 52 which is non-rotatable, and which is sealed to the pump casing by means of an O-ring 54. A carbon seal ring 56 rotates with shaft 16, and runs in rubbing contact with the ceramic seat 52. The seal ring 56 is urged toward the seat by means of a compression spring 58 which bears against a flexible diaphragm 60 and a washer 62. The diaphragm may be made of a suitable synthetic rubber, and fits the shaft against leakage. The diaphragm assembly turns with the shaft, and thus the pump seal is between the carbon ring 56 and the ceramic seat 52. The rear end of compression spring 58 is supported by a retainer 64 held in position by means of a snap ring 66.

In the present case the seal is water cooled, and for that purpose it is enclosed in a cup 68 which is secured to the pump casing, in this case by means of a screw thread 70. The cup is sealed at one end by means of an O-ring 72, and at the other end by means of a rubber diaphragm 74. A typical pipe connection for cooling purposes is shown at 76. An opposite hole is shown plugged at 78. There are preferably four such holes, disposed 90° apart. Any two of the holes are plugged while the other two have pipe connections for circulation of cooling water. In a common arrangement to two connections may be at 45° to the vertical and 90° apart. The single pipe 76 is merely representative. The hood 22 is preferably slotted or cut away as shown at 80, for passage of the cooling pipes. When there is no need to water cool the seal, the hood 22 may be complete, that is the slot 80 may be omitted. In such case the cup 68 also is preferably omitted, thereby better exposing the seal 30 for air cooling.

The cast base 14 is preferably formed with a trough adjacent the pump casing, and this may be lined with a tray 82 made of a plastic material which is resistant to the chemical being handled by the pump. The tray acts to catch any drip or spillage from the pump.

Figure 5:
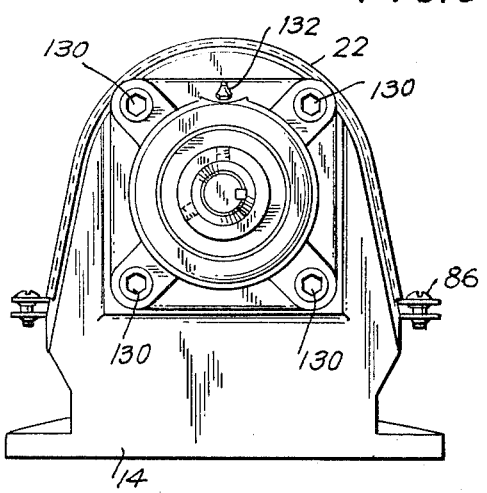
FIG. 5 is an end view looking toward the left end as viewed in FIGS. 1 and 3.

The hood 22 is convex upwardly. It is an inverted trough, as is best seen in FIG. 4. The fixed bearing 28 is a flanged bearing which is secured against an upright pedestal plate 84, formed integrally at one end of base 14. The pump casing is bolted against an upright pedestal plate 26 cast integrally at the other end of base 14. The plates 84 and 26 are suitably shaped to support and to close the ends of the hood 22, as will be seen in FIGS. 4 and 5. The hood is held in position by screws 86 passing through outwardly bent lower edges 87. Thus the hood is readily removed, preparatory to sliding back the slidable bearing 32.

The hood could be screwed directly to the cast base, but as here shown is fastened to angle strips 88, which in turn are fastened to the edges of plate 34 by means of screws 89.

The pedestal plate 84 may be strengthened by diagonal struts or webs 90, best shown in FIGS. 3 and 4, and the pump pedestal plate 26 may be similarly strengthened by diagonal webs 92, best shown in FIGS. 1 and 3. These stiffening webs or braces are located close to the sides of the hood 22, and do not interfere with slide plate 34 and the slidable bearing 32.

In order to handle corrosive liquids the parts of the pump exposed to the liquid may be made of a moldable plastics material instead of metal. Referring to FIG. 3, the inlet 18, and the outer casing wall 100, are made of plastic, these parts being joined in the present case by means of screw thread 102. The inner casing wall 104 is also made of plastic, and the two walls 100 and 104 are sealed by means of a suitable gasket or O-ring 106.

The plastic walls are backed up and strengthened, as well as squeezed together, by cast metal parts. In the present case there is a cast metal back wall 108, and a cast metal front wall 110, these being assembled by a ring of screws 112. The back wall 108 is mounted on the pedestal plate 26 by means of another ring of screws 114. The casting 110 preferably includes a cylindrical part 11 which acts as a protective support for the plastic inlet 18.

The shaft 16 at the seal is protected by a sleeve 116 made of a suitable nonmetallic or plastic material. It will be recalled that the seat 52 and ring 56 are nonmetallic (in the present case ceramic and carbon respectively). The pump impeller 24 is made of a plastic material, and is secured on the end of shaft 16 by means of a nut 118, also made of plastic. If desired, the hub of impeller 24 may be lined with metal for mating keyed engagement with the shaft, but in such case the metal lining is protected against exposure by the plastic material of the impeller 24, the nut 118, and the sleeve 116.

Figure 6:
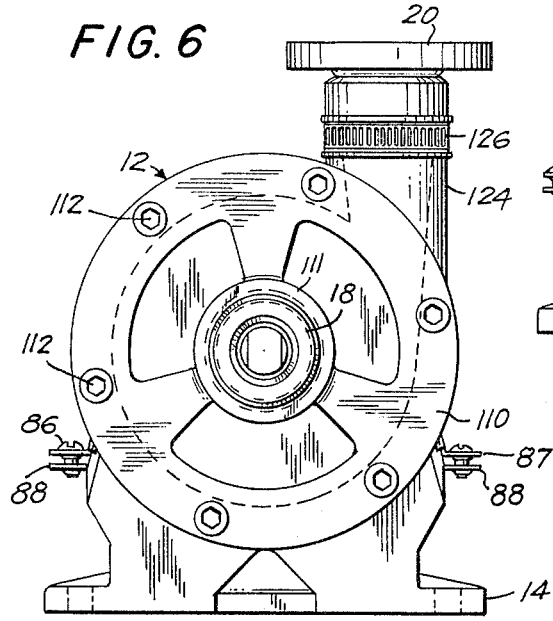
FIG. 6 is an end view looking toward the right end as viewed in FIGS. 1 and 3.

The parts 120 and 122 of the outlet 20 are made of a molded plastic material. They constitute an adapter to fit the piping in which the pump is to be connected, here illustrated as requiring a flange connection. This adapter is secured to the outlet portion 124 (FIG. 6) of the pump casing by means of a suitable clamp ring 126. A suitable adapter may be used at 18 for a flange connection, or at 120 for a pipe thread connection.

The side plate 34 may be made of iron or steel. For corrosion resistance it may be made of stainless steel, and in some special situations a rigid plastic such as a thermosetting phenolic may be used.

Bearings 28 and 32 are here shown as ball bearings. They are preferably of the self-aligning type. Other bearings may be used. In the present case the fixed bearing 28 is of the flange type, and is bolted directly to upright pedestal 84 by means of four screws 130, best shown in FIG. 5. A suitable nipple may be provided at 132 for lubrication. Dowels may be provided for accurate location of the bearings, or two of the four screws may be of a special type used for accurate location by the provision of locating shoulders which act as locating dowels. In similar fashion the location of pump casing 12 on pedestal 26 may be fixed by dowels, or some of the ring of screws 114 may have locating shoulders to act as dowels.

It is believed that the construction and method of use of my improved centrifugal pump, as well as the advantages thereof, will be apparent from the foregoing detailed description. The slidable bearing may be located close to the seal, thereby minimizing the overhang of the shaft and any possible deflection at the impeller. This lack of deflection minimizes vibration and increases the life and the integrity of the seal. The spacing between the two main bearings of the shaft is made a maximum, relative to the overall length of the pump, or differently expressed, the overall length is reduced for a desired spacing between bearings. When a seal is to be inspected or serviced, it is a simple matter to remove the hood and loosen the T bolts which hold the slidable bearing, whereupon the bearing may be slid toward the fixed bearing for a substantial distance. This gives maximum access to the seal, and even the delicate brittle parts then may be handled without danger of breakage.

The arrangement provides generous and greatly increased space for mechanical seal inspection. It becomes possible to closeely inspect the faces of the seal elements without removing the same. It is easy to flush out accumulated debris and crystals which may collect around the seal. The parts when reassembled may be adjusted with great precision because there is ample room to use instruments such as a depth micrometer or a measuring scale. There is open access at the top of the pump, as well as from the side of the pump.

The pump may be fitted with any of a wide variety of seals, and without regard to the axial length of the seal, because the slidable bearing may be locked in any desired position, and therefore may be backed away somewhat from the pump casing to make room for a seal of greater axial dimension. The seal may be water cooled, as is preferred in pumps of medium or large size. The illustrated pump has a four inch impeller, an axial length of about eighteen inches, and may be driven by motors up to fifteen horsepower. This is an example but the pump may be made in different sizes.

Corrosion-proof plastic material may be employed, even in large sizes, because the plastic parts are suitably backed and reinforced by metal parts. A separate slide plate is preferred because it then may be made of a highly corrosion-resistant material, without having to abandon the use of cast iron for the pedestal. For example, stainless steel or a plastic may be used for the slide plate. It is also replaceable should it become worn.

It will be understood that although I have shown and described my invention in a preferred form, changes may be made in the structure shown, without departing from the scope of the invention, as sought to be defined in the following claim.

I claim:

A centrifugal pump comprising a casing which houses an impeller carried on an overhung shaft, an elongated base, said pump casing being mounted at one end of the base, a fixed bearing mounted at the other end of the base, a seal around said shaft at the casing, a movable bearing slidably mounted on the base adjacent the seal, said bearings being well spaced apart axially for good support of the overhung shaft, a slide plate fixedly mounted on the base beneath the movable bearing to afford sliding of the movable bearing away from the seal toward the fixed bearing for easy access to the parts of the seal, said slide plate and movable bearing having guide means extending longitudinally of the base to keep the slidable bearing in accurate alignment with the fixed bearing and the pump as the bearing is moved toward or away from the seal, said movable bearing being secured in position by inverted T head bolts the heads of which are received in the base, said base having wide slots for the heads of the T bolts, and the slide plate having narrow slots over the said wide slots for the shanks of the T bolts, said plate being fixedly mounted on the base to thereby form T slots for the T bolts.

References Cited by the Examiner

UNITED STATES PATENTS

| | | | |
|---|---|---|---|
| 1,263,561 | 4/1918 | Keating et al. | 103—103 |
| 1,874,324 | 8/1932 | MacMeeken | 103—103 |
| 2,199,595 | 5/1940 | Millard | 103—111 |
| 2,283,263 | 5/1942 | Kates et al. | 103—114 |
| 2,427,656 | 9/1947 | Blom | 103—111 |
| 2,571,802 | 10/1951 | Wilfley et al. | 103—111 |
| 2,824,759 | 2/1958 | Tracy | 103—111 |

FOREIGN PATENTS

| | | |
|---|---|---|
| 1,092,539 | 11/1954 | France. |
| 1,314,736 | 12/1962 | France. |
| 652,840 | 5/1951 | Great Britain. |

OTHER REFERENCES

Chemical Engineering, Mechanical Seals, September 1956, pp. 199–210 (page 210 most pertinent).

MARK NEWMAN, *Primary Examiner.*

HENRY F. RADUAZO, SAMUEL LEVINE, *Examiners.*